(12) United States Patent
Chen et al.

(10) Patent No.: US 11,382,172 B2
(45) Date of Patent: Jul. 5, 2022

(54) COMBINING UPLINK RADIO SIGNALS

(71) Applicant: Telefonaktiebolaget LM Ericsson (publ), Stockholm (SE)

(72) Inventors: Tsao-Tsen Chen, Täby (SE); Gunther Auer, Stockholm (SE); Miguel Berg, Sollentuna (SE); Mattias Frenne, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/766,629

(22) PCT Filed: Oct. 8, 2015

(86) PCT No.: PCT/SE2015/051074
§ 371 (c)(1),
(2) Date: Apr. 6, 2018

(87) PCT Pub. No.: WO2017/061915
PCT Pub. Date: Apr. 13, 2017

(65) Prior Publication Data
US 2018/0295674 A1    Oct. 11, 2018

(51) Int. Cl.
*H04W 88/08* (2009.01)
*H04B 7/155* (2006.01)
(Continued)

(52) U.S. Cl.
CPC ......... *H04W 88/085* (2013.01); *H04B 7/155* (2013.01); *H04B 7/15507* (2013.01);
(Continued)

(58) Field of Classification Search
CPC ............ H04W 88/085; H04W 28/085; H04W 72/0453; H04B 7/155; H04B 7/15507; H04B 7/204; H04B 1/1027
See application file for complete search history.

(56) References Cited

U.S. PATENT DOCUMENTS

| | | | | |
|---|---|---|---|---|
| 6,694,154 B1 * | 2/2004 | Molnar | ............... | H04B 7/18532 455/277.1 |
| 8,085,782 B2 * | 12/2011 | Fahldieck | ........... | H04W 88/085 370/394 |

(Continued)

FOREIGN PATENT DOCUMENTS

| | | |
|---|---|---|
| WO | WO 2015/099586 A1 | 7/2015 |
| WO | WO 2015/133952 A1 | 9/2015 |
| WO | WO 2016/128023 A1 | 8/2016 |

OTHER PUBLICATIONS

Communication pursuant to Article 94(3) EPC for application 15 787 718.4, dated May 15, 2019, 6 pages.
(Continued)

*Primary Examiner* — Huy D Vu
*Assistant Examiner* — Bailor C. Hsu
(74) *Attorney, Agent, or Firm* — Sage Patent Group

(57) ABSTRACT

It is presented a method for controlling uplink contribution from a plurality of remote radio heads in a combiner. The method is performed in a remote radio head controller and comprises the steps of: determining a first set of at least one remote radio head; determining a second set of at least one remote radio head, wherein the first set and the second set are disjoint; selecting a first uplink carrier for a first wireless device; selecting a second uplink carrier for a second wireless device; and applying a configuration such that the at least one remote radio head of the first set refrains from contributing on a first channel with uplink signals on the second uplink carrier and that the at least one remote radio head of the second set refrains from contributing on the first channel with uplink signals on the first uplink carrier.

17 Claims, 7 Drawing Sheets

(51) Int. Cl.
H04B 7/204 (2006.01)
H04W 28/08 (2009.01)
H04W 72/04 (2009.01)
H04B 1/10 (2006.01)

(52) U.S. Cl.
CPC .......... *H04B 7/204* (2013.01); *H04W 28/085* (2013.01); *H04W 72/0453* (2013.01); *H04B 1/1027* (2013.01)

(56) References Cited

U.S. PATENT DOCUMENTS

| | | | | |
|---|---|---|---|---|
| 8,559,868 | B2* | 10/2013 | Wan | H04B 7/2606 455/11.1 |
| 8,682,338 | B2* | 3/2014 | Lemson | H03F 1/3247 455/453 |
| 8,817,848 | B2* | 8/2014 | Lemson | H04B 10/25753 375/211 |
| 8,908,602 | B2* | 12/2014 | Yoshiuchi | H04W 16/10 370/328 |
| 9,066,252 | B2* | 6/2015 | Liu | H04W 28/0289 |
| 9,173,118 | B2* | 10/2015 | Wang | H04W 24/04 |
| 9,184,842 | B2* | 11/2015 | Dahlfort | H04J 14/0282 |
| 9,258,718 | B2* | 2/2016 | Ji | H04W 64/00 |
| 9,532,362 | B2* | 12/2016 | Marinier | H04W 72/06 |
| 9,832,732 | B2* | 11/2017 | Ouchi | H04W 52/242 |
| 9,918,285 | B2* | 3/2018 | Gao | H04W 52/346 |
| 2010/0290413 | A1* | 11/2010 | Kuwahara | H04W 24/02 370/329 |
| 2012/0189074 | A1* | 7/2012 | Jin | H04B 7/024 375/267 |
| 2012/0257516 | A1 | 10/2012 | Pazhyannur et al. | |
| 2013/0128810 | A1* | 5/2013 | Lee | H04W 84/042 370/328 |
| 2013/0250875 | A1* | 9/2013 | Chen | H04W 52/365 370/329 |
| 2013/0343332 | A1* | 12/2013 | Yao | H04W 72/0453 370/329 |
| 2014/0016586 | A1* | 1/2014 | Khan | H04L 1/0003 370/329 |
| 2014/0187254 | A1* | 7/2014 | Wang | H04W 24/04 455/452.1 |
| 2015/0245402 | A1* | 8/2015 | Mochizuki | H04W 76/15 370/331 |
| 2015/0296344 | A1* | 10/2015 | Trojer | H04W 4/027 455/456.1 |
| 2016/0173208 | A1* | 6/2016 | Kuchi | H04W 88/085 375/267 |
| 2016/0242147 | A1* | 8/2016 | Tarlazzi | H04W 72/04 |
| 2016/0337057 | A1* | 11/2016 | Osterling | H04B 1/109 |
| 2017/0059717 | A1* | 3/2017 | Polehn | G01S 19/48 |
| 2017/0150317 | A1* | 5/2017 | Iun | H04W 68/005 |

OTHER PUBLICATIONS

International Search Report and Written Opinion of the International Searching Authority, PCT/SE2015/051074, dated Aug. 18, 2016, 14 pages.

Chen, X., et al., "On Distributed Antenna Systems With Limited Feedback Precoding: Opportunities and Challenges," IEEE Wireless Communications, Apr. 2010, pp. 80-88.

Medbo, et al., "Simple and Accurate Path Loss Modeling at 5 GHz in Indoor Environments With Corridors," $52^{nd}$ IEEE VTS Fall VTC 2000 Vehicular Technology Conference, Sep. 24-28, 2000, pp. 30-36.

Lu, C., et al., "Connecting the Dots: Small Cells Shape Up for High-Performance Indoor Radio," Ericsson Review, Dec. 19, 2014, 10 pages.

* cited by examiner

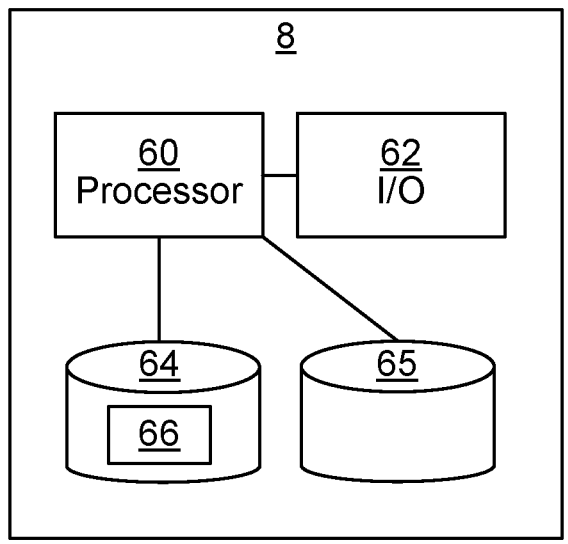
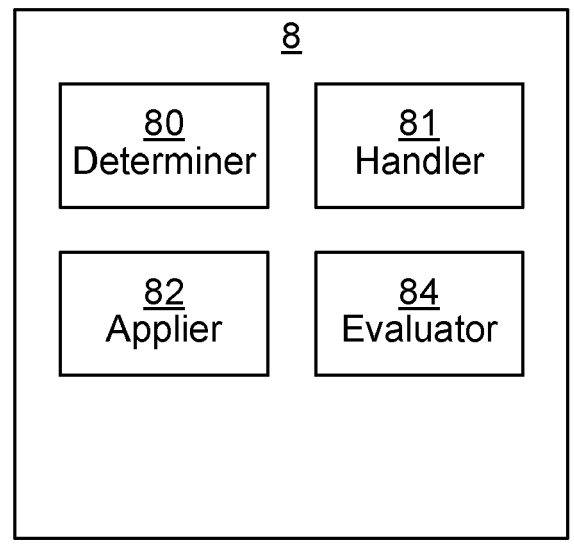
Fig. 7              Fig. 8
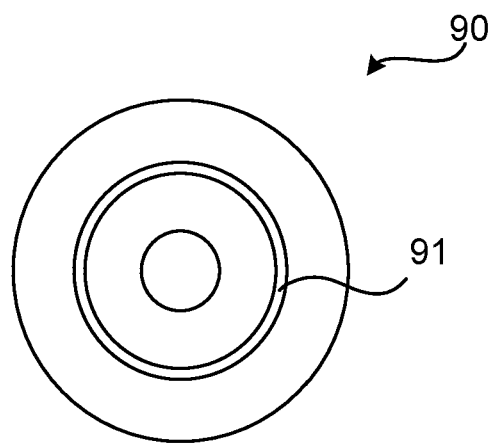
Fig. 9

COMBINING UPLINK RADIO SIGNALS

CROSS REFERENCE TO RELATED APPLICATIONS

This application is a 35 U.S.C. § 371 national stage application of PCT International Application No. PCT/SE2015/051074 filed on Oct. 8, 2015, the disclosure and content of which is incorporated by reference herein in its entirety.

TECHNICAL FIELD

The invention relates to a method, a remote radio head controller, a computer program and a computer program product for controlling remote radio head contribution by a plurality of remote radio heads.

BACKGROUND

When deploying wireless communication networks, there is a balance between coverage and capacity. On the one hand, a few large cells can provide great coverage but at a cost of reduced capacity. On the other hand, a scenario with many small cells creates better capacity and throughput, but may not provide the desired coverage. Hence, there is often a combination of larger cells to provide sufficient coverage with smaller cells to provide better capacity.

However, when the cells get too small, wireless devices moving in the network cause a great number of handovers which causes significant overhead. Moreover, providing coverage indoors using many small cells can be quite costly, with a radio base station for each such small cell.

One solution to this problem is to use remote radio heads, where several remote radio heads connected to the same radio base station share the same cell. In this way, a single radio base station can provide coverage in different parts of the building by placing the remote radio heads appropriately. Moreover, the wireless device can move between the coverage of different remote radio heads while staying within the same cell, thus avoiding causing handovers. The wireless device will not realize that it is served by different remote radio heads, but see it as one single cell.

However, when uplink signals from the remote radio heads are combined in a combiner this also creates some issues. Due to the different locations of wireless devices, these can cause interference to each other. Also, the noise floor is raised since thermal noise from all remote radio heads are added in the combining. Moreover, uplink cable resources are limited from the remote radio head.

SUMMARY

It is an object to improve how uplink signals received in remote radio heads are combined.

According to a first aspect, it is provided a method for controlling uplink contribution from a plurality of remote radio heads in a combiner, wherein each remote radio head is capable of receiving a plurality of carriers on respectively different frequencies. The method is performed in a remote radio head controller and comprises the steps of: determining a first set of at least one remote radio head, selected from the plurality of radio heads which should be used for uplink data reception from a first wireless device; determining a second set of at least one remote radio head, selected from the plurality of radio heads which should be used for uplink data reception from a second wireless device, wherein the first set and the second set are disjoint; selecting a first uplink carrier for the first wireless device and configuring the first wireless device to use the first uplink carrier; selecting a second uplink carrier for the second wireless device and configuring the second wireless device to use the second uplink carrier; and applying a configuration such that the at least one remote radio head of the first set refrains from contributing on a first channel with uplink signals on the second uplink carrier and that the at least one remote radio head of the second set refrains from contributing on the first channel with uplink signals on the first uplink carrier. By using disjoint sets for the uplink signal reception, interference and noise is reduced. Moreover, capacity usage on cabling is reduced.

The step of determining the first set may comprise determining at least one remote radio head, selected from the plurality of radio heads which should be used for uplink data reception from the first wireless device and a third wireless device; and the step of determining the second set may comprise determining at least one remote radio head, selected from the plurality of radio heads which should be used for uplink data reception from the second wireless device and a fourth wireless device.

The step of applying a configuration may comprise applying a configuration such that the at least one remote radio head of the first set refrains from contributing on a second channel with uplink signals on the first uplink carrier and that the at least one remote radio head of the second set refrains from contributing on the second channel with uplink signals on the second uplink carrier.

The method may be repeated every subframe.

The first channel may be implemented using Ethernet cabling.

The method may further comprise the step of: evaluating uplink performance simultaneously of several different wireless links, each wireless link being defined to be between one remote radio head and one wireless device. In such a case, the step of determining a first set comprises considering the evaluated uplink performance and the step of determining a second set comprises considering the evaluated uplink performance.

The step of evaluating uplink performance may comprise the sub-steps of: applying a configuration such that only one of the remote radio heads provides uplink signals received on a plurality of evaluation carriers on different sub-channels and configuring a plurality of wireless devices to transmit reference signals on respective mutually unique evaluation carriers.

The step of evaluating uplink performance may comprise the sub-steps of: applying a configuration such that a plurality of the remote radio heads provide uplink signals received on an evaluation carrier on respectively different sub-channels and configuring one wireless device to transmit reference signals on the evaluation carrier.

According to a second aspect, it is provided a remote radio head controller for controlling uplink contribution from a plurality of remote radio heads in a combiner, wherein each remote radio head is capable of receiving a plurality of carriers on respectively different frequencies. The remote radio head controller comprises: a processor; and a memory storing instructions that, when executed by the processor, cause the remote radio head controller to: determine a first set of at least one remote radio head, selected from the plurality of radio heads which should be used for uplink data reception from a first wireless device; determine a second set of at least one remote radio head, selected from the plurality of radio heads which should be used for uplink data reception from a second wireless device, wherein the first set and the second set are disjoint; select a first uplink carrier for the first wireless device and configure the first wireless device to use the first uplink carrier; select a second uplink carrier for the second wireless device and configure the second wireless device to use the second uplink carrier; and apply a configuration such that at least one remote radio head of the first set refrains from contributing on a first channel with uplink signals on the second uplink carrier and that at least one remote radio head of the second set refrains from contributing on the first channel with uplink signals on the first uplink carrier.

The instructions to determine the first set may comprise instructions that, when executed by the processor, cause the remote radio head controller to determine at least one remote radio head, selected from the plurality of radio heads which should be used for uplink data reception from the first wireless device and a third wireless device. In such a case, the instructions to determine the second set comprise instructions that, when executed by the processor, cause the remote radio head controller to determine at least one remote radio head, selected from the plurality of radio heads which should be used for uplink data reception from the second wireless device and a fourth wireless device.

The instructions to apply a configuration may comprise instructions that, when executed by the processor, cause the remote radio head controller to apply a configuration such that the at least one remote radio head of the first set refrains from contributing on a second channel with uplink signals on the first uplink carrier and that the at least one remote radio head of the second set refrains from contributing on the second channel with uplink signals on the second uplink carrier.

The remote radio head controller may further comprise instructions that, when executed by the processor, cause the remote radio head controller to repeat the mentioned instructions every subframe.

The first channel may be configured to be implemented using Ethernet cabling.

The remote radio head may further comprise instructions that, when executed by the processor, cause the remote radio head controller to: evaluate uplink performance simultaneously of several different wireless links, each wireless link being defined to be between one remote radio head and one wireless device. In such a case, the instructions to determine a first set comprise instructions that, when executed by the processor, cause the remote radio head controller to consider the evaluated uplink performance and the instructions to determine a second set comprise instructions that, when executed by the processor, cause the remote radio head controller to considering the evaluated uplink performance.

The instructions to evaluate uplink performance may comprise instructions that, when executed by the processor, cause the remote radio head controller to: apply a configuration such that only one of the remote radio heads provides uplink signals received on a plurality of evaluation carriers on different sub-channels; and configure a plurality of wireless devices to transmit reference signals on respective mutually unique evaluation carriers.

The instructions to evaluate uplink performance may comprise instructions that, when executed by the processor, cause the remote radio head controller to: apply a configuration such that a plurality of the remote radio heads provide uplink signals received on an evaluation carrier on respectively different sub-channels; and configure one wireless device to transmit reference signals on the evaluation carrier.

According to a third aspect, it is provided a remote radio head controller comprising: means for determining a first set of at least one remote radio head, selected from a plurality of radio heads, each capable of receiving a plurality of carriers on respectively different frequencies, wherein the at least one radio head of the first set should be used for uplink data reception from a first wireless device; means for determining a second set of at least one remote radio head, selected from the plurality of radio heads which should be used for uplink data reception from a second wireless device, wherein the first set and the second set are disjoint; means for selecting a first uplink carrier for the first wireless device and configuring the first wireless device to use the first uplink carrier; means for selecting a second uplink carrier for the second wireless device and configuring the second wireless device to use the second uplink carrier; and means for applying a configuration such that the at least one remote radio head of the first set refrains from contributing on a first channel with uplink signals on the second uplink carrier and that the at least one remote radio head of the second set refrains from contributing on the first channel with uplink signals on the first uplink carrier when combined in a combiner.

According to a fourth aspect, it is provided a computer program for controlling uplink contribution from a plurality of remote radio heads in a combiner, wherein each remote radio head is capable of receiving a plurality of carriers on respectively different frequencies. The computer program comprises computer program code which, when run on a remote radio head controller causes the remote radio head controller to: determine a first set of at least one remote radio head, selected from the plurality of radio heads which should be used for uplink data reception from a first wireless device; determine a second set of at least one remote radio head, selected from the plurality of radio heads which should be used for uplink data reception from a second wireless device, wherein the first set and the second set are disjoint; select a first uplink carrier for the first wireless device and configure the first wireless device to use the first uplink carrier; select a second uplink carrier for the second wireless device and configure the second wireless device to use the second uplink carrier; and apply a configuration such that the at least one remote radio head of the first set refrains from contributing on a first channel with uplink signals on the second uplink carrier and that the at least one remote radio head of the second set refrains from contributing on the first channel with uplink signals on the first uplink carrier.

According to a fifth aspect, it is provided a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 7 is a schematic diagram showing some components of an embodiment of the remote radio head controller of FIG. 1;

FIG. 8 is a schematic diagram showing functional modules of the software instructions of the remote radio head controller of FIG. 1 or FIG. 7 according to one embodiment; and FIG. 9 shows one example of a computer program product comprising computer readable means.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
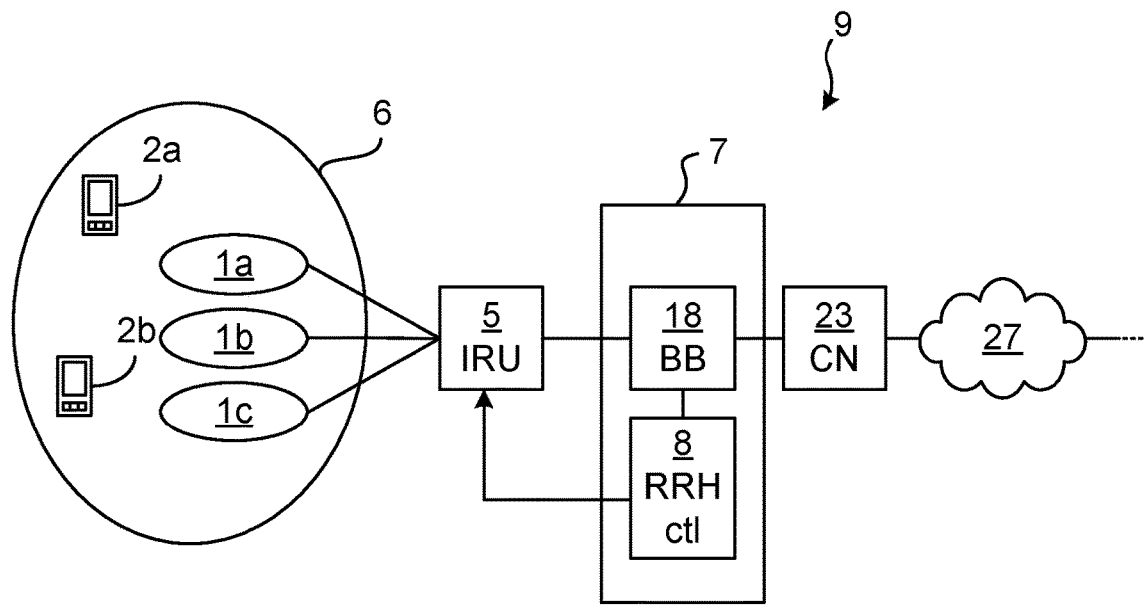
FIG. 1 is a schematic architecture diagram illustrating an environment where embodiments presented herein can be applied.

FIG. 1 is a schematic architecture diagram illustrating an environment where embodiments presented herein can be applied. A wireless communication network 9 comprises a number of remote radio heads (RRHs) 1a-c for installation in locations where traditional deployment with antennas being co-located with the base stations is not ideal. For example, the wireless communication network 9 can be installed indoors, such as in an office, shopping centre, train station or airport.

It is to be noted that, while the embodiments presented herein are described as implemented using LTE (Long Term Evolution) and/or W-CDMA (Wideband Code Division Multiplex), any applicable communication standard may be used, such as any one or a combination of LTE-SAE (Long Term Evolution-System Architecture Evolution), GSM (Global System for Mobile communication), EDGE (Enhanced Data Rates for GSM Evolution), GPRS (General Packet Radio Service), CDMA2000 (Code Division Multiple Access 2000), or any other current or future wireless network, such as LTE-Advanced, as long as the principles described hereinafter are applicable.

A base station 7 here comprises one or more baseband processors (BBP) 18 and a remote radio head controller 8. A combiner 5 is used in the uplink to combine uplink signals from a plurality of remote radio heads 1a-c and forward data to the baseband processors 18. In downlink, the combiner 5 may function as a splitter, providing downlink signals from the baseband processor 18 to each one of the connected remote radio heads 1a-c. The combiner 5 is also known as an indoor radio unit (IRU). It is to be noted though that the combiner may also be provided outdoors whenever appropriate. The combiner is in this way a link for a number (in this example three) of remote radio heads 1a-c. In this way, the base station 7 is a link for uplink and downlink communication for the remote radio heads connected to the combiner 5. One function of the base station 7 is to function as a digital unit (DU), using the one or more baseband processors 18, for processing uplink and downlink signals in the digital domain.

It is to be noted that the combiner 5 can be provided separate from the base station 7 as shown in FIG. 1, but the combiner 5 can also be provided as part of the base station 7.

The base station 7 is also connected to a core network 23. The core network 23 provides central functions and connectivity to external networks 27 such as the Internet.

The remote radio heads 1a-c connected to the combiner 5 are part of a single radio cell 6 and thus share a cell identifier. Antennas do not need to be included in this embodiment of the base station 7 or the combiner 5, as the remote radio heads 1a-c provide the antennas for the wireless link to one or more wireless devices 2a-b. The wireless link provided by the remote radio heads 1a-c includes both downlink (DL) communication to the wireless devices 2a-b and uplink (UL) communication from the wireless devices 2a-b. The term wireless device is also known as mobile communication terminal, user equipment (UE), station (STA), mobile terminal, user terminal, user agent, machine-to-machine devices etc., and can be, for example, what today is commonly known as a mobile phone or a tablet/laptop with wireless connectivity or fixed mounted terminal.

In radio communication systems, the data is transmitted and received over the air at a specific radio frequency—either the same for transmission and reception or on separate frequencies. This is often called the radio frequency (RF) or the carrier frequency.

There are many different carrier frequencies, depending on regional spectrum allocation and spectrum license rights. To create a common radio implementation supporting this variety of carrier frequencies, a second set of frequencies is used herein, denoted the Intermediate Frequency (IF), which is used for communication on the cables between the combiner 5 and the remote radio heads 1a-c.

It is to be noted that the processing of uplink and downlink signals in the combiner and the remote radio heads 1a-c do not need to occur in the digital domain and can be (but do not need to be) performed completely in the analogue domain.

The remote radio heads 1a-c convert from IF to RF for downlink transmission and from RF to IF for uplink reception. Conversely, the combiner 5 converts from digital BB to IF for downlink transmission and from IF to digital BB for uplink reception.

By using IF instead of RF over the cables between the combiner 5 and the remote radio heads 1a-c, cheaper, widely deployed electrical cables can be used, such as Ethernet LAN cabling. In this way, existing indoor cabling can many times be reused during installation, which significantly saves cost, installation time and complexity. Optionally, the remote radio heads 1a-c are also powered over the respective cables.

The transmission and reception is under the control of the MAC (Media Access Control) scheduler in the baseband module 18. The MAC scheduler informs what transmissions should be made and informs, via the downlink signaling, the wireless devices when to transmit and on which frequency and power.

The link between the combiner 5 and the baseband processor 18 utilises a digital signal interface, such as CPRI (Common Public Radio Interface).

The remote radio head controller 8 controls how the uplink signals from the remote radio heads 1*a*-*c* are combined in the combiner 5, as described in more detail below. Specifically, contribution via remote radio heads with poor radio characteristics can be reduced. The remote radio head controller 8 can also signal to the wireless devices 2*a*-*b* on what carrier they are to transmit.

It is to be noted that, although FIG. 1 shows the baseband module 18 connected to one combiner 5, each baseband module 18 can be connected to several combiners over separate links. Also, each combiner 5 can be connected to several baseband modules 18, e.g. if each baseband module 18 supports a single radio access technology (RAT) or for load balancing/redundancy reasons.

It is to be noted that while the embodiment of FIG. 1 shows three remote radio heads 1*a*-*c*, there may be fewer or more remote radio heads connected to each combiner 5.

Figure 2:
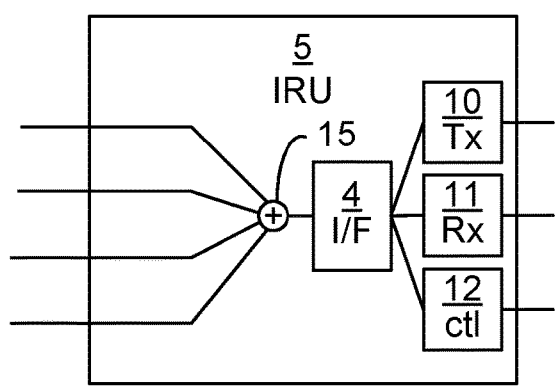
FIG. 2 is a schematic diagram illustrating components of an embodiment of a combiner 5 of FIG. 1.

FIG. 2 is a schematic diagram illustrating components of an embodiment of a combiner 5 of FIG. 1. The combiner and its components will now be explained in a context of uplink and downlink communication using a remote radio head.

For uplink communication, the remote radio heads downconvert a received (uplink) signal to IF and send it over its cable to the combiner 5. The received IF signals from several remote radio heads are combined in a combiner unit 15 and fed to an interface circuitry 4. The interface circuitry 4 extracts the received IF signal from the interface and forwards it to the RX (reception) back-end 11. In one embodiment, the RX back-end 11 comprises an analogue to digital (A/D) converter which samples the signal on IF and converts to a digital signal. In another embodiment, the RX back-end 11 first downconverts the received signals from IF to an analogue BB (baseband) signal which is further filtered and converted to a digital signal in an A/D converter. The RX back-end 11 sends the combined received signals in digital form (e.g. over CPRI) to the baseband processing device for further processing such as radio channel measurement, demodulation, decoding, etc. as known in the art per se. The combiner 5 may comprise more than one combiner units 15 as appropriate, e.g. for different IF bands.

For downlink communication, the process works in reverse to the uplink. Hence, the baseband module sends a digital BB signal for transmission to a TX (transmission) back-end 10 of the combiner 5. In one embodiment, the TX back-end 10 converts the digital BB signal to an analogue signal in IF directly in a digital to analogue (D/A) converter. In another embodiment, the TX back-end 10 first converts the digital BB signal to an analogue transmission signal and upconverts the transmission signal to IF in the analogue domain. The transmission signal in IF is then inserted onto the interface by the interface circuitry 4, and provided to the combiner unit 15 which also functions as a splitter, providing the same transmission signal in IF to all connected remote radio heads over the respective cables. The remote radio heads then upconvert the IF signal to RF and transmit the RF signal over the air to the wireless devices 2*a*-*b*.

Moreover, there is a control link between a controller 12 in the combiner 5 and each remote radio head. This control link can be used e.g. to control tuning and/or mapping as explained in more detail below.

Optionally, instead of IF, the cable between the remote radio heads and the combiner 5 are transmitted using a digital link. Such a link can support one stream for each carrier received by the remote radio head.

Figure 3:
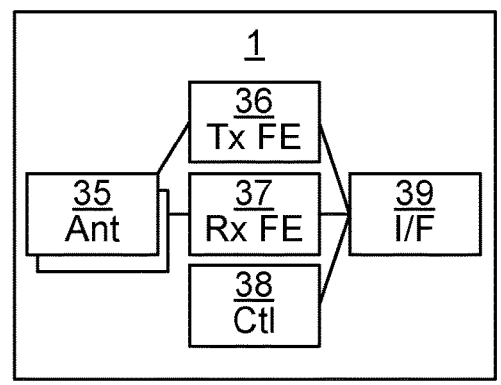
FIG. 3 is a schematic architecture diagram illustrating components of an embodiment of a remote radio head of FIG. 1.

FIG. 3 is a schematic architecture diagram illustrating components of an embodiment of a remote radio head of FIG. 1, here represented by a single remote radio head 1. The remote radio head comprises interface circuitry 39, a transmission front-end 36, a reception front-end 37, a controller 38 and an antenna device 35. It is to be noted that the antenna device 35 may comprise any number of antenna, e.g. one, two, four, six, eight, etc. When two or more antennas are used, MIMO (Multiple Input Multiple Output) can be employed. It should also be noted that a remote radio head may also support TDD/FDD operation and multi-band operation. Each antenna can be used for receiving one or more carriers, where each carrier is defined by a frequency band. For instance, there may be two antennas, each capable of simultaneously receiving two carriers (by appropriate tuning). In this way, the remote radio head 1 can receive four simultaneous carriers.

In line with what is explained above, the RX Front End 37 downconverts received signals in RF to IF for transfer over the cable to the combiner 5. Moreover, the TX Front End 36 upconverts transmission signals from IF, as received over the cable from the combiner 5 to RF for transmission to wireless devices.

The interface circuitry 39 inserts and extracts (multiplexes and demultiplexes) the transmission IF signal, the received IF signal and the control signal onto/from the cable. The interface circuitry 39 may use different frequency bands for uplink signals, downlink signals and control signals to thereby multiplex all of these on a single cable.

A controller 38 communicates with the controller 12 of the combiner. The controller 38 can be implemented using software instructions such as a computer program executed by a processor and/or using only hardware, such as application specific integrated circuits, field programmable gate arrays, discrete logical components, etc.

The remote radio had 1 can also map each uplink carrier to a band for provision to the combiner. For instance, when IF is used, each carrier can be mapped to one of a plurality of available frequency bands on the cable. When a digital link is provided between the remote radio head and the combiner, each carrier is mapped to a separate stream. This is further illustrated in FIGS. 5A-D and FIGS. 6A-C and is explained in more detail below. Reception on each carrier of each antenna can be activated or deactivated as necessary.

Figure 4A:
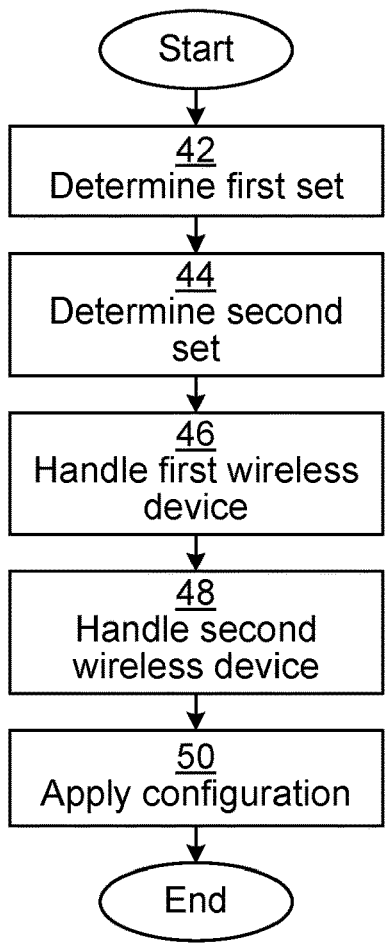
FIGS. 4A-C are flow charts illustrating embodiments of methods performed in the remote radio head controller of FIG. 1.
Figure 4B:
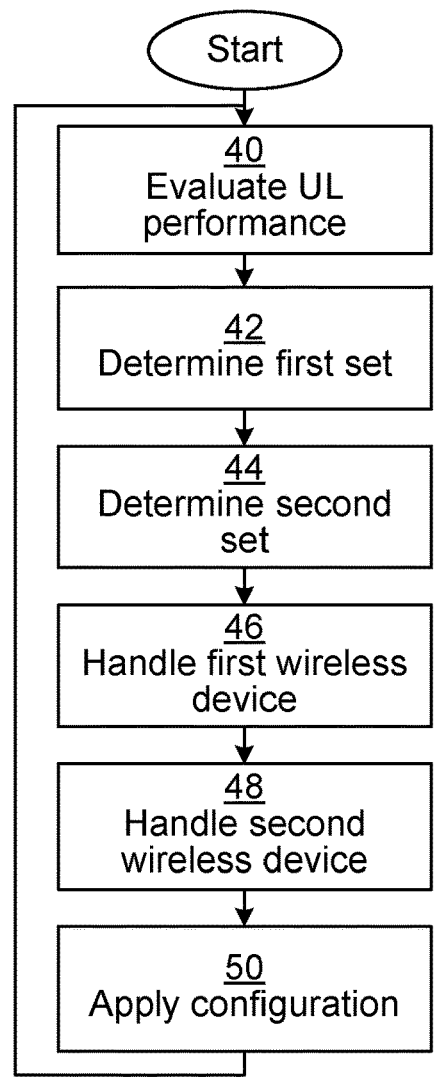
Figure 4C:
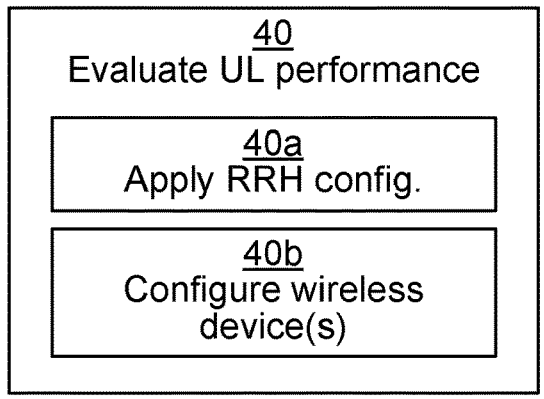

FIGS. 4A-C are flow charts illustrating embodiments of methods performed in the remote radio head controller 8 of FIG. 1. First, an embodiment of the method illustrated in FIG. 4A will be described. The method is used to control uplink contribution from a plurality of remote radio heads in the combiner. Each one of the remote radio heads is capable of receiving a plurality of carriers on respectively different frequencies.

In a determine first set step 42, a first set of at least one remote radio head is determined. The at least one remote radio head of the first set is selected from the plurality of radio heads which should be used for uplink data reception from a first wireless device. Optionally, the selected at least one radio head of the first set is determined to be used for a plurality of wireless devices, e.g. the first wireless device and a third wireless device.

In a determine second set step 44, a second set of at least one remote radio head is determined. The at least one remote radio head of the second set is selected from the plurality of radio heads which should be used for uplink data reception from a second wireless device. The first set and the second set are disjoint.

Optionally, the selected at least one radio head of the second set is determined to be used for a plurality of wireless devices, e.g. the second wireless device and a fourth wireless device.

In a handle first wireless device step 46, a first uplink carrier is selected for the first wireless device and the first wireless device is configured to use the first uplink carrier.

In a handle second wireless device step 48, a second uplink carrier is selected for the second wireless device and the second wireless device is configured to use the second uplink carrier.

In an apply configuration step 50, a configuration is applied such that the at least one remote radio head of the first set refrains from contributing on a first channel with uplink signals on the second uplink carrier. The configuration also makes the at least one remote radio head of the second set refrain from contributing on the first channel with uplink signals on the first uplink carrier. The first channel is a channel which is combined in the combiner and can receive contribution from all of the remote radio heads. For instance, the first channel can be implemented using Ethernet cabling as explained above.

Optionally, there is more than one channel from the remote radio heads, going to a second combiner. In such a case, this step can comprise applying a configuration such that the at least one remote radio head of the first set refrains from contributing on a second channel with uplink signals on the first uplink carrier. Moreover, the configuration makes the at least one remote radio head of the second set refrain from contributing on the second channel with uplink signals on the second uplink carrier. This situation corresponds to an embodiment which is illustrated in FIG. 5D and explained below. The first channel and the second channel can be implemented using separate cables or separate twisted pairs in the same cable.

Using embodiments presented herein, the first set of remote radio heads is used for receiving uplink data from the first wireless device (and optionally one or more wireless devices) and the second set of remote radio heads is used for receiving data from the second wireless device (and optionally one or more wireless devices). Essentially, the remote radio heads are divided between the wireless devices, making uplink reception more efficient and less demanding on uplink resources, such as cables to the combiner. As shown in FIGS. 5A-D and explained below, many sub-channels are not mapped with uplink reception, freeing up capacity on cables for other purposes such as increased diversity order (e.g. MIMO) and/or control signalling.

The embodiments presented herein are useful in a situation where there are more carrier frequencies than the hardware can process. For instance, in unlicensed LTE, there may be a large number of carrier frequencies which can not be processed simultaneously.

Looking now to FIG. 4B, only new or modified steps compared to the method illustrated by the flow chart of FIG. 4A will be described.

In an evaluate UL performance step 40, uplink performance is evaluated simultaneously of several different wireless links, each wireless link being defined to be between one remote radio head and one wireless device. Simultaneously is here to be construed as the same time frame, e.g. the same subframe when LTE is applied. The evaluation can be based on reference signals (e.g. Sounding Reference Signals) transmitted from one or more wireless devices.

In such a case, the determine first set step 42 comprises considering the evaluated uplink performance and the determine second set step 44 comprises considering the evaluated uplink performance.

The method may be repeated as often as every subframe to allow an appropriate response to changing conditions. Optionally, the evaluate uplink performance step 40 is not performed in every iteration of the method.

Figure 6A:
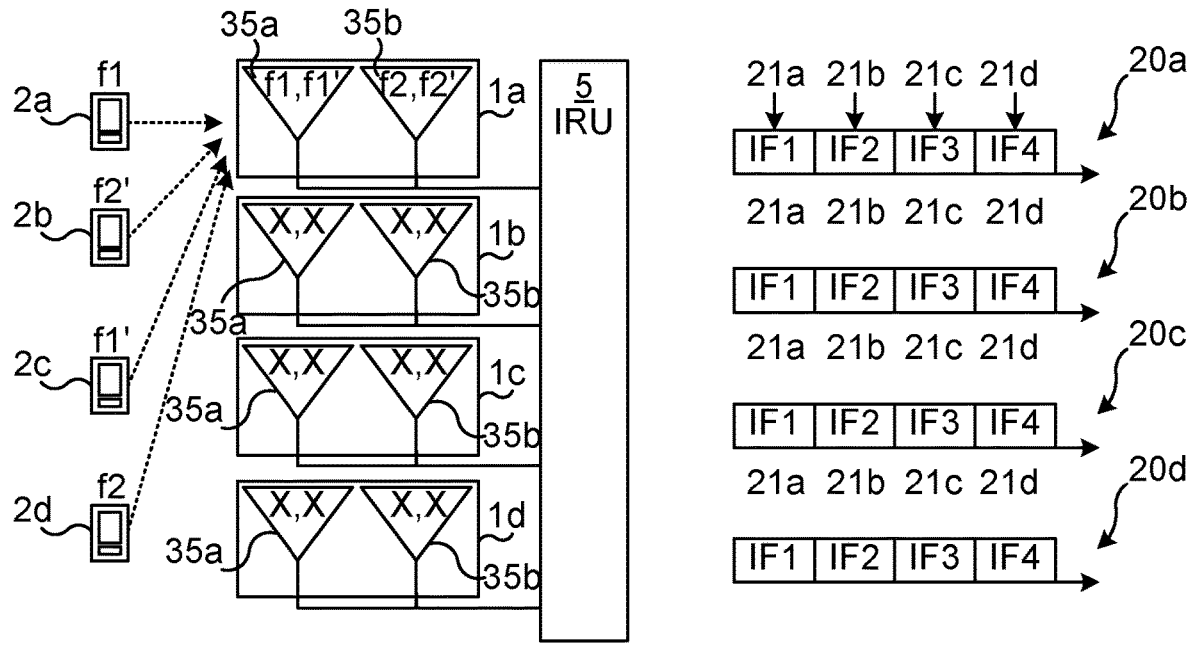
FIGS. 6A-C are schematic diagrams illustrating how uplink performance can be evaluated according to various embodiments.
Figure 6B:
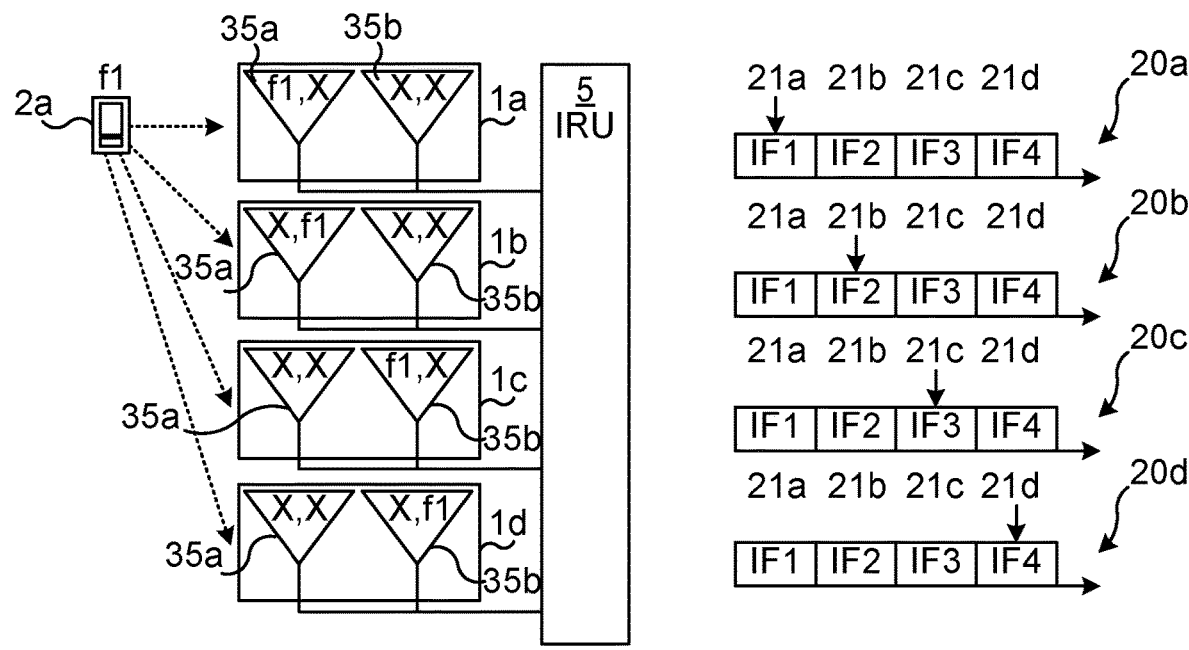
Figure 6C:
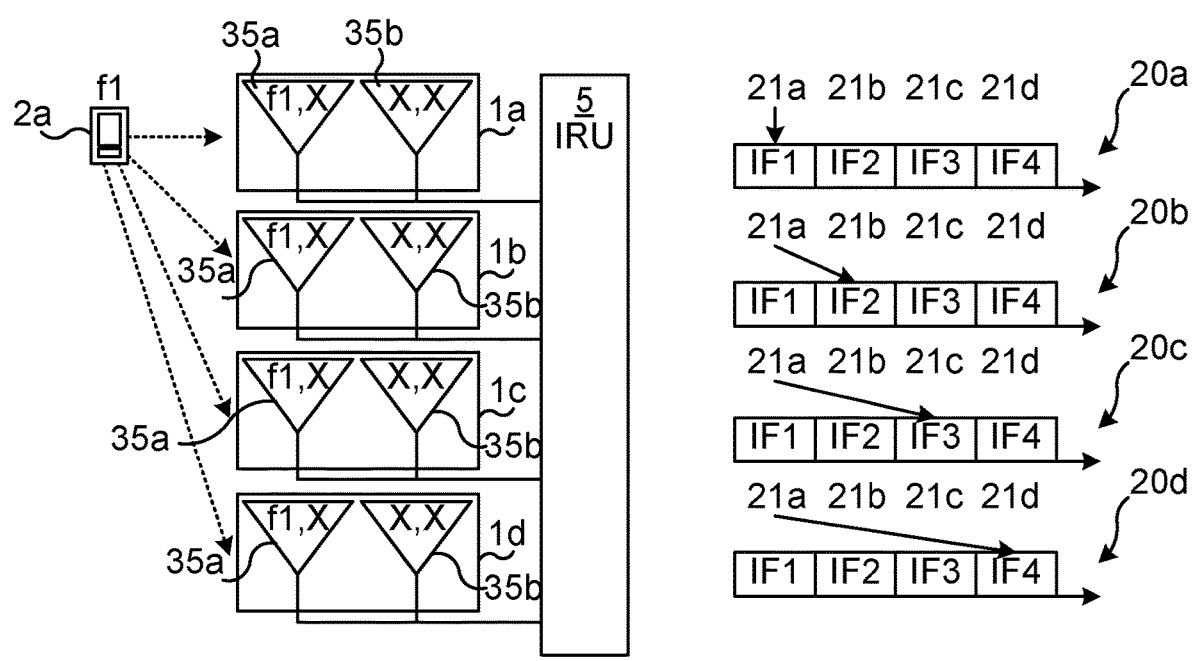

Looking now to FIG. 4C, an embodiment of the evaluate uplink performance step 40 of FIG. 4B is described in more detail. Embodiments of this step is illustrated in FIGS. 6A-C and described in more detail below.

The evaluate UL performance step 40 here comprises two sub-steps: an apply RRH config sub-step 40*a* and a configure wireless device(s) sub-step 40*b*.

In one embodiment, the apply RRH config sub-step 40*a* comprises applying a configuration such that only one of the remote radio heads provides uplink signals received on a plurality of evaluation carriers on different sub-channels. Each sub-channel can e.g. be a band on an intermediate frequency link or a digital stream. The configure wireless device(s) sub-step 40*b* then comprises configuring a plurality of wireless devices to transmit reference signals on respective mutually unique evaluation carriers. An example of this embodiment is shown in FIG. 6A and is described below.

In one embodiment, the apply RRH config sub-step 40*a* comprises applying (40*a'*) a configuration such that a plurality of the remote radio heads provide uplink signals received on an evaluation carrier on respectively different sub-channels. The configure wireless device(s) sub-step 40*b* then comprises configuring one wireless device to transmit reference signals on the evaluation carrier. Examples of this embodiment are shown in FIGS. 6B-C and are described below.

FIGS. 5A-D are schematic diagrams illustrating how uplink radio reception can be controlled according to various embodiments. Common parameters for the cell used in the following embodiments are given below.

Assume that one cell contains J RRHs, where each RRH contains M receive antenna ports (AP) where M=1 or M>1, and each antenna port, across all J RRHs, can receive L carriers at the same time. Therefore there are at most N=M*L available carriers in each RRH, if they are tuned to different carrier frequencies for multiband operation. In the examples shown in FIGS. 5A-D, M=2 and L=2, whereby there are N=4 available carriers, denoted as carrier 1 to carrier 4 from left to right inside each RRH. A default frequency assignment is that f1 and are two carrier frequencies from band 1 assigned to carrier 1 and carrier 2, respectively, in AP1, and f2 and f2' are another two carrier frequencies from band 2 assigned to carrier 3 and carrier 4, respectively, in AP2.

If a carrier is assigned with carrier frequency f, the carrier will be denoted as f-carrier.

The received signal from each carrier inside each RRH will be mapped to one of the N=4 available intermediate frequencies (IF) used by the twisted-pair in the LAN cable: IF1, IF2, IF3 and IF4. Different mapping from carrier to IF can be used.

The cell also contains one IRU, and the IRU is connected to one BBP in DU through one CPRI. Inside IRU, signals transmitted by the same IF in the twisted-pair from all RRHs can be combined at the IF level. Signals transmitted by IF1, IF2, IF3 and IF4 will be combined by combiner 1 to combiner 4, respectively.

Apart from the described analogue IF interface, a digital interface with a combining unit similar to the IRU can also be used. A digital interface could contain e.g. antenna carriers (AxCs) or sampled IF signals that are digitally combined before the DU in order to save fronthaul capacity. Therefore in general, carriers will be mapped to "containers", "fronthaul resources" or "streams" on the cable, which could be intermediate frequencies, AxCs, or something else depending on the type of interface used. For the non-limiting examples used herein carriers will be mapped to intermediate frequencies.

Each of the L carriers in each of the M antenna ports (across all J RRHs) can individually be turned on or off, or be tuned from one frequency to another frequency, dynamically on subframe level. Note that a carrier in one antenna port being turned on or off in a subframe, for a given RRH, means that the corresponding IF signal in the twisted-pair from that RRH is or is not connected to the combiner for that carrier inside IRU in that subframe, respectively. The sign "x" inside one antenna port is used to indicate that the corresponding carrier is not utilised for reception and is turned off.

In practical implementation, the L carriers in one AP will be tuned to L frequencies from the same frequency band, due to the limited bandwidth of the RF filter. For example, the L=2 carriers in one AP will be tuned to f1 and f1', respectively, or f2 and f2' respectively. However, the application of the following embodiments to the scenario where each carrier can be independently tuned to one the N available carrier frequencies is not excluded.

A receiver chain in the cell consists of bandwidth resources with the same IF in LAN cables, the corresponding carriers and RF fronts in all RRHs, combiner, A/D, bandwidth resource in CPRI, baseband processing resource in BBP, etc. The received signals in different receiver chains will be multiplexed and sent through CPRI to BBP separately.

It is assumed that each cell contains S receiver chains, and hence S combiners. Then, in this example, with S=N=4, each receiver chain (or combiner) corresponds to one available frequency in the system.

Additional antenna ports over the same N available carrier frequencies can be added in each RRH to support multiple-input multiple-output (MIMO), transmitting diversity, or receiving diversity operation. That is, the MIMO or diversity operation is done per carrier frequency. In this case, the number of receiver chains (or combiners) has to be increased proportionally. For example, S=2*N if N additional APs are added in each RRH for receiving diversity. In this case, the received signals from carriers in the N additional APs in each RRH will be sent to IRU through a second twisted-pair in LAN cable. In order not to obscure the description, examples herein will be given without such additional APs for MIMO or diversity operation.

A wireless device will transmit data on one uplink carrier frequency if it is capable of transmitting at only one frequency at the same time. If the wireless device supports uplink carrier aggregation, then the wireless device may be configured to transmit data on multiple uplink carrier frequencies simultaneously, or on different uplink carriers in different, interlaced, subframes, or it may be configured to transmit data on only one uplink carrier frequency.

For load balancing operation in UL, each wireless device is configured to transmit data on only one uplink carrier frequency. The assignment of carrier frequency to each wireless device is done by some load balancing algorithm.

Control signaling can be sent from DU to IRU and/or RRHs for needed configuration before each scheduled subframe for data transmission/reception. The configuration includes carrier frequency assignment to carriers, carrier to IF mapping, selected combining of signals inside the combiner, etc.

In order not to obscure the description, embodiments are written mainly for selected combining in UL unless otherwise mentioned. However, most of the following embodiments for selected combining for data reception in UL can be applied to transmission of DL data from selected RRHs; that is, selected transmission of data in DL.

Multiple wireless devices served by the same cell may be scheduled for DL or UL transmission in the same subframe by frequency division multiple access (FDMA) and/or time division multiple access (TDMA). In FDMA, wireless devices are scheduled over different frequency subcarriers at the same time symbol(s), while in TDMA, wireless devices are scheduled over different time symbols at the same frequency subcarrier(s). In order not to obscure the description, FDMA and TDMA are not described herein. For carrier aggregation operation, only one wireless device is scheduled over N carrier frequencies by one cell in one subframe, unless otherwise mentioned.

Multiband operation in the distributed antenna system can also be used in the multi-operator scenario. In this case, each band would be assigned to a different operator. Operators could then share cables and RRHs, but keep their own baseband units. For simplicity in description, the single-operator scenario is considered in all related embodiments. However, the related embodiments can be applied to the multi-operator scenario.

In FIGS. 5A-D, the left hand side shows four remote radio heads 1a-d and four wireless devices 2a-d. Each wireless device 2a-d transmits on a carrier with a frequency indicated above the respective wireless device 2a-d. In this example, there are four available carriers with the frequencies f1, f1', f2, and f2'. f1 and f1' are close enough in frequency that they can be received by a single appropriately tuned antenna in a remote radio head (or other receiving antenna). Analogously, f2 and f2' are close enough in frequency that they can be received by a single appropriately tuned antenna in a remote radio head (or other receiving antenna). In the figures, a frequency (f1, f1', f2 or f2') in an antenna 35a-b indicates that the antenna is configured to receive the carrier of that frequency. An 'x' in an antenna 35a-b indicates that no signal from that part of the antenna is combined to the combined signal. Each antenna 35a, 35b has its own antenna port. Since each antenna can receive two carriers i.e. f1 and f1' or f2 and f2', then each RRH can receive a total of four carriers (two antenna ports multiplied by two carriers). These received carriers are denoted a first carrier 21a, a second carrier 21b, a third carrier 21c and a fourth carrier 21d (for each RRH).

Each one of the received carriers 21a-d can be mapped to a respective sub-channel of a channel prior to providing the signals to the combiner. Here, the right hand side schematically shows mapping of received carriers 21a-d to sub-channels IF1, IF2, IF3 and IF4 of a respective channel 20a-d for each one of the remote radio heads 1a-d. In each mapping, the first carrier 21a corresponds to the left received carrier of the first antenna 35a. The second carrier 21b corresponds to the right received carrier of the first antenna 35a. The third carrier 21c corresponds to the left received carrier by the second antenna 35b. The fourth carrier 21d corresponds to the right received carrier by the second antenna 35b. After mapping, the uplink signals are provided on corresponding channels 20a-d and all of the channels 20a-d are combined in the combiner 5.

Figure 5A:
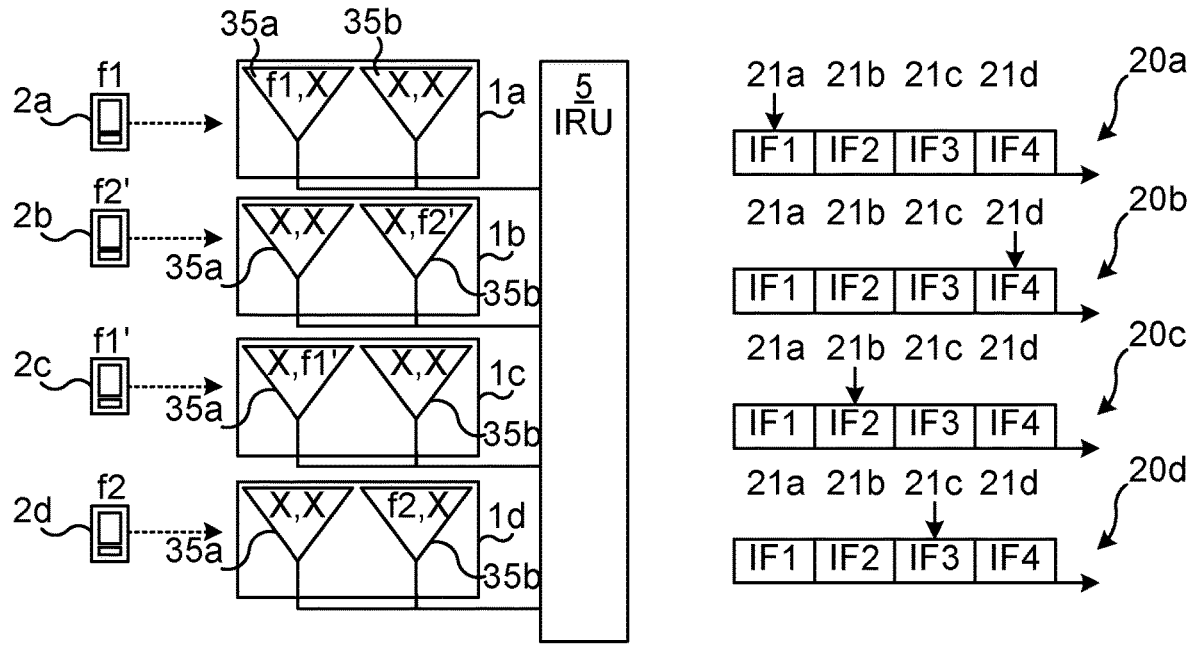
FIGS. 5A-D are schematic diagrams illustrating how uplink radio reception can be controlled according to various embodiments.

Looking now to an embodiment illustrated in FIG. 5A, there are here four wireless devices 2a-d. The first wireless device 2a transmits uplink signals on a first carrier frequency f1. The second wireless device 2b transmits uplink signals on a fourth carrier frequency f2'. The third wireless device 2c transmits uplink signals on a second carrier frequency f1'. The fourth wireless device 2d transmits uplink signals on a third wireless carrier frequency f2.

Here, the first RRH 1a receives the first carrier frequency f1, the second RRH 1b receives the fourth carrier frequency f2', the third RRH 1c receives the second carrier frequency f1' and the fourth RRH 1d receives the third carrier frequency f2. Other carrier frequencies are blocked by the respective RRHs.

The mapping is here straight for received signals on each one of the received carriers 21a-d. Hence, for the channel 20a of the first RRH 1a, the first carrier 21a (receiving the first carrier frequency f1) is mapped to the first sub-channel IF1. For the channel 20b of the second RRH 1b, the fourth carrier 21d (receiving the fourth carrier frequency f2') is mapped to the fourth sub-channel IF4. For the channel 20C of the third RRH 1c, the second carrier 21b (receiving the second carrier frequency f1') is mapped to the second sub-channel IF2. For the channel god of the fourth RRH 1d, the third carrier 21c (receiving the third carrier frequency f2) is mapped to the third sub-channel IF3.

Here a first set of RRHs contains the first RRH 1a, a second set of RRHs contains the second RRH 1b, a third set of RRHs contains the third RRH 1c, and a fourth set of RRHs contains the fourth RRH 1d. All of these sets are disjoint, whereby the signals received from each one of the RRHs do not interfere with each other.

With this embodiment, the network node controlling the cell turns on only one carrier in each RRH from the union of the four RRH sets, {RRH 1}∪{RRH 2}∪{RRH 3}∪{RRH 4}, with the default carrier frequency assignment for data reception, as shown in the left-hand side of FIG. 5A. Also, the default carrier to IF mapping can be used by all RRHs, as shown in the right-hand side of FIG. 5A. However, mapping for the unused carriers will not be shown in the carrier to IF mapping.

Since only one received carrier is mapped to each one of the channels 20a-d, the traffic load in the cables used by the four RRHs 1a-d is reduced by 75% compared to if all received carriers are provided in the uplink cable.

Figure 5B:
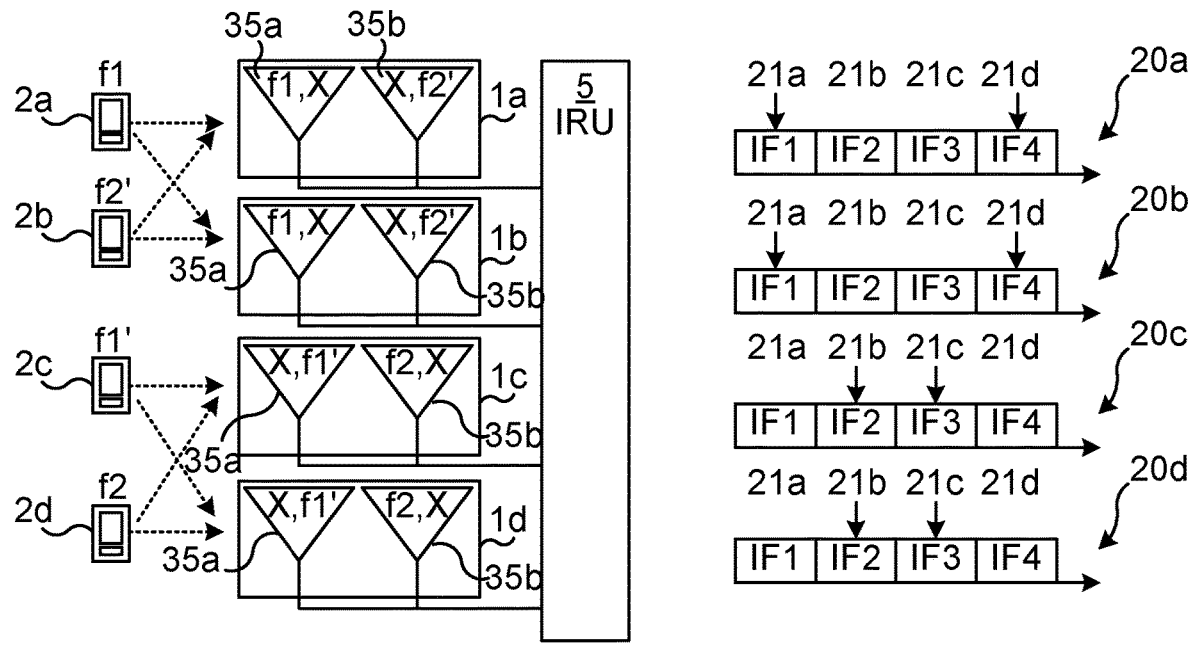

In FIG. 5B, it is shown an embodiment where the four wireless devices 2a-d transmit uplink signals as shown in the embodiment of FIG. 5A. Here however, the first RRH 1a receives both the first carrier frequency f1 and the fourth carrier frequency f2'. Also the second RRH 1b receives both the first carrier frequency f1 and the fourth carrier frequency f2'. The third RRH 1c receives the second carrier frequency f1' and the third carrier frequency f2. Also the fourth RRH 1d receives the second carrier frequency f1' and the third carrier frequency f2. Other carrier frequencies are blocked by the respective RRHs.

The mapping is here straight for received signals on each one of the received carriers 21a-d. Hence, for the channel 20a of the first RRH 1a, the first carrier 21a (receiving the first carrier frequency f1) is mapped to the first sub-channel IF1 and the fourth carrier 21d (receiving the fourth carrier frequency f2') is mapped to the fourth sub-channel IF4. The mapping is the same for the channel 20b of the second RRH 1b.

For the channel 20C of the third RRH 1c, the second carrier 21b (receiving the second carrier frequency f1') is mapped to the second sub-channel IF2 and the third carrier 21c (receiving the third carrier frequency f2) is mapped to the third sub-channel IF3. The mapping is the same for the channel god of the fourth RRH 1d.

A first set of RRHs here contains the first RRH 1a and the second RRH 1b, and a second set of RRHs contains the third RRH 1c and the fourth RRH 1d. The two sets are disjoint, whereby the signals received from each one of the RRHs do not interfere with each other. This divides up the RRHs dynamically into two separate sets—where the first set receives signals from the first wireless device 2a and the second wireless device 2b, while the second set receives signals from the third wireless device 2c and the fourth wireless device 2d.

Hence, the maximum number of wireless devices simultaneously scheduled over the same set of RRHs is restricted to N/2=2. Again, cable traffic load is reduced, here by at least 50%. Moreover, receiving antenna diversity order (or MIMO order) can be doubled.

The condition on cable traffic load is taken into account in the load balancing and selected combining process so that the traffic load is reduced or kept below a prescribed threshold.

With the above two load balancing user pairings, the network node controlling the cell turns on only two carriers in each RRH from the union of the two RRH sets, {RRH 1, RRH 2}∪{RRH 3, RRH 4}, for UL data reception, as shown in the left-hand side of FIG. 5B. Therefore, the traffic load in the cables used by the four RRHs can be reduced by 50%. Also, the default carrier to IF mapping can be used by all RRHs, as shown in the right-hand side of FIG. 5B. However, mapping for the unused carriers will not be shown in the carrier to IF mapping.

Depending on the frequency assignments to wireless devices according to some load balancing algorithm, this embodiment can be performed with different configurations for carrier frequency assignment and carrier to IF mapping than those in the embodiment illustrated in FIG. 5B, while still achieving the same gains. An example scenario is given in FIG. 5C, where frequencies f1, f1', f2' and f2 have been assigned to the first wireless device, the second wireless device, the third wireless device, and the fourth wireless device, respectively, according to some load balancing algorithm.

Figure 5C:
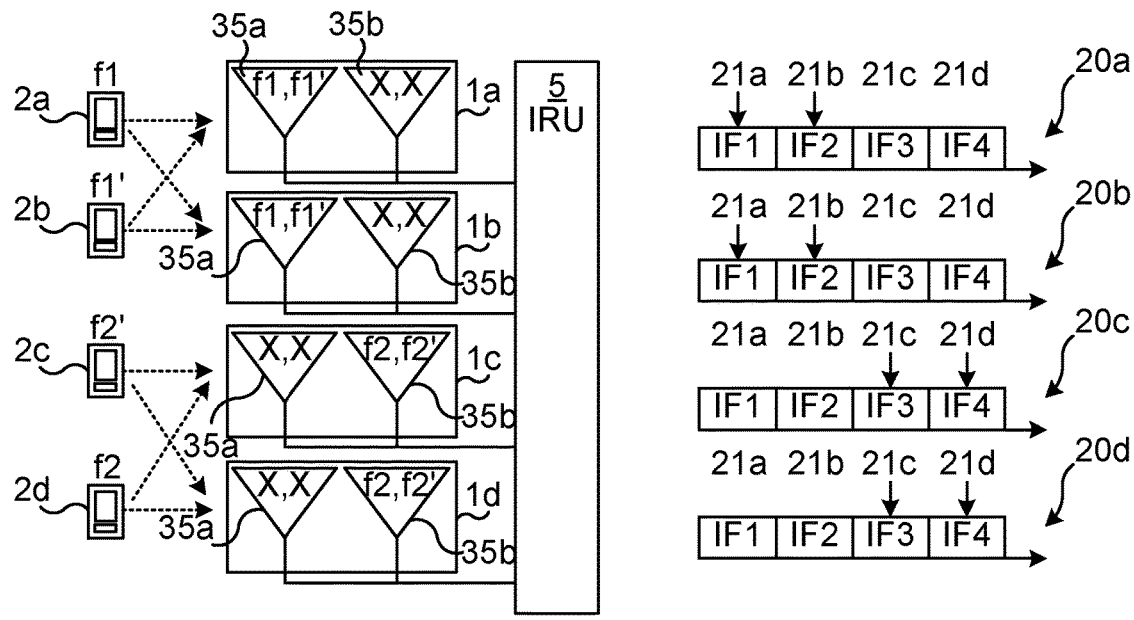
Figure 5D:
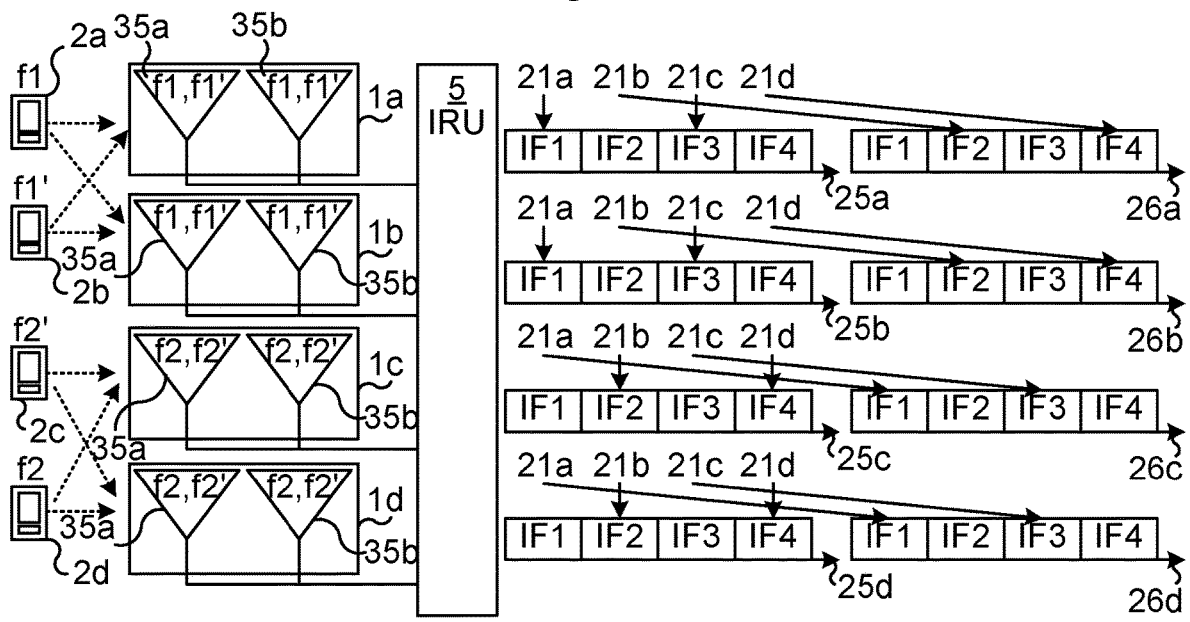

Looking now to an embodiment illustrated in FIG. 5C, the four wireless devices 2a-d transmit uplink signals as shown in the embodiment of FIG. 5B. The difference here is that the first RRH 1a and the second RRH 1b receive the first carrier frequency f1 and the second carrier frequency f1'. The third RRH 1c and the fourth RRH 1d receive the third carrier frequency f2 and the fourth carrier frequency f2'. The mapping reflects the received carrier frequencies for the respective RRHs 1a-d.

Therefore, when compared with the prior art load balancing scheme, the proposed method achieves selected combining gain and reduces the traffic load in the cables by at least 50%, while still maintaining the same load balancing gain.

Looking now to an embodiment illustrated in FIG. 5D, the four wireless devices 2a-d transmit uplink signals as shown in the embodiment of FIG. 5C. In this embodiment however, there are two channels (e.g. two twisted pairs or two cables) to two respective combiners. So for each RRH 1a-d, there is a respective first channel 25a-d and a respective second channel 26a-d. The first channels 25a-d and the second channels 26a-d are combined separately.

Here, the first RRH 1a and the second RRH 1b receive the first carrier frequency f1 and the second carrier frequency f1' on both antennas 35a-b. The third RRH 1c and the fourth RRH 1d receive the third carrier frequency f2 and the fourth carrier frequency f2' on both antennas 35a-b.

The mapping is arranged so that for the first cable 25a-b for the first and second RRHs 1a-b, the first carrier 21a and the third carrier 21c (which both receive the first carrier frequency f1) are mapped to first sub-channel IF1 and the third sub-channel IF3, respectively. For the second cable 26a-b for the first and second RRHs 1a-b, the second carrier 21b and the fourth carrier 21d (which both receive the second carrier frequency f1') are mapped to second sub-channel IF2 and the fourth sub-channel IF4, respectively.

For the first cable 25c-d for the third and fourth RRHs is-d, the second carrier 21b and the fourth carrier 21d (which both receive the fourth carrier frequency f2') are mapped to second sub-channel IF2 and the fourth sub-channel IF4, respectively. For the second cable 26c-d for the third and fourth RRHs is-d, the first carrier 21a and the third carrier 21c (which both receive the third carrier frequency f2) are mapped to first sub-channel IF1 and the third sub-channel IF3, respectively.

Thus, for UL data reception, the cell turns on all carriers in each AP from the union of the two sets of RRHs, {RRH 1, RRH 2}∪{RRH 3, RRH 4}, with the following proposed carrier frequency assignment to increase the receiving antenna diversity order (or MIMO order), as shown in the left-hand side of FIG. 5D. For RRH 1 and RRH 2, carriers 1 to 4 (from left to right in each RRH) are assigned carrier frequencies f1, f1', f1, and f1', respectively, while for RRH 3 and RRH 4, carriers 1 to 4 are assigned carrier frequencies f2, f2', f2, and f2', respectively.

As the signal transmitted from one wireless device at one carrier frequency will now be received by two carriers located in two different APs in each RRH, the receiving antenna diversity order (or MIMO order) is doubled. Therefore, twice the number of receiver chains, when compared with the prior art, are used including the second channel connecting each RRH and IRU.

A new carrier to IF mapping is proposed, as shown in the right-hand side of FIG. 5D, such that signals will be properly combined in IRU and then be individually processed by different receiver chains. The traffic load in each cable will also be evenly distributed among the channels (e.g. the two twisted-pairs).

If the receiving antenna diversity order (or MIMO order) is to be doubled by adding more APs in each RRH, two times receiver chains, including the second twisted-pair in the cable connecting each RRH and IRU, are also needed. Given that only 50% of the bandwidth in each twisted-pair is used FIG. 5D, this embodiment also reduces the cable traffic load by 50%.

For example, frequency f1 is assigned to carrier 1 in RRH 1 and carrier 1 in RRH 2. The two carrier is in RRH 1 and RRH 2 are mapped to IF1 in the first twisted-pair and they will be combined by a first combiner in IRU at IF (IF1) level to generate the first diversity signal for the first wireless device. On the other hand, frequency f1 is also assigned for carrier 3 in RRH 1 and carrier 3 in RRH 2. The two carriers in RRH 1 and RRH 2 are mapped to IF3 in the first twisted-pair and they will be combined by a second combiner in IRU at IF (IF3) level to generate the second diversity signal for the first wireless device. The two diversity signals for the first wireless device will then be separately sent through CPRI to DU for diversity combining.

Therefore, when compared with the prior art, the proposed method achieves selected combining gain and increases (doubles) the receiving antenna diversity order (or MIMO order), while still maintaining the same load balancing gain.

FIGS. 6A-C are schematic diagrams illustrating how uplink performance can be evaluated according to various embodiments. The evaluation illustrated in FIGS. 6A-C relies on the same structure that is shown in FIGS. 5A-D used for uplink data reception. Only differences to the description of FIGS. 5A-D will be pointed out here.

Looking now to an embodiment illustrated in FIG. 6A, there are here four wireless devices 2a-d. The first wireless device 2a transmits uplink reference signals on a first carrier frequency f1. The second wireless device 2b transmits uplink reference signals on a fourth carrier frequency f2'. The third wireless device 2c transmits uplink reference signals on a second carrier frequency f1'. The fourth wireless device 2d transmits uplink reference signals on a third wireless carrier frequency f2. In this embodiment, the first RRH 1a receives all of the four carrier frequencies f1, f1', f2, f2' but all other RRHs 1b-d are switched off for reception.

The mapping is here straight for received signals on each one of the received carriers 21a-d for the channel 20a of the first RRH 1a. Hence, the first carrier 21a (receiving the first carrier frequency f1) is mapped to the first sub-channel IF1, the second carrier 21b (receiving the second carrier frequency f1') is mapped to the second sub-channel IF2, the third carrier 21c (receiving the third carrier frequency f2) is mapped to the third sub-channel IF3, and the fourth carrier 21d (receiving the fourth carrier frequency f2') is mapped to the fourth sub-channel IF4.

In this way, simultaneous evaluation of several different wireless links is achieved, where each wireless link is defined to be between one remote radio head and one wireless device. In particular, the four wireless links between each one of the wireless devices 2a-d and the first remote radio head 1a can be evaluated simultaneously (e.g. in the same subframe). In the next occasion of evaluation, the scheme can be applied for all wireless devices and the second RRH 1b, etc.

In FIG. 6B, an embodiment is shown where a single wireless device transmits reference signals to four RRHs 1a-d on the first carrier frequency f1. Here, all four RRHs 1a-d receive the first carrier frequency f1, but each one on a different antenna.

The mapping is here straight for received signals on each one of the received carriers 21a-d. Hence, the first carrier 21a of the first RRH 1a is mapped to the first sub-channel IF1, the second carrier 21b of the second RRH 1b is mapped to the second sub-channel IF2, the third carrier 21c of the third RRH 1c is mapped to the third sub-channel IF3, and the fourth carrier 21d of the fourth RRH 1d is mapped to the fourth sub-channel IF4.

In this way, simultaneous evaluation of several different wireless links is achieved where the four wireless links between each one of the RRHs 1a-d and the first wireless device 2a can be evaluated simultaneously (e.g. in the same subframe). In the next occasion of evaluation, the scheme can be applied for a second wireless device 2b, etc.

In FIG. 6C, as in FIG. 6B, an embodiment is shown where a single wireless device transmits reference signals to four RRHs 1a-d on the first carrier frequency f1. Here, though, the four RRHs 1a-d receive the first carrier frequency f1, on the same corresponding antenna.

The mapping then maps to different sub-channels for different RRHs 1*a-d*. Specifically, the first carrier 21*a* of the first RRH 1*a* is mapped to the first sub-channel IF1, the first carrier 21*a* of the second RRH 1*b* is mapped to the second sub-channel IF2, the first carrier 21*a* of the third RRH 1*c* is mapped to the third sub-channel IF3, and the first carrier 21*a* of the fourth RRH 1*d* is mapped to the fourth sub-channel IF4.

In this way, simultaneous evaluation of several different wireless links is achieved where the four wireless links between each one of the RRHs 1*a-d* and the first wireless device 2*a* can be evaluated simultaneously (e.g. in the same subframe). In the next occasion of evaluation, the scheme can be applied for a second wireless device 2*b*, etc.

FIG. 7 is a schematic diagram showing some components of an embodiment of the remote radio head controller 8 of FIG. 1. It is to be noted that when the remote radio head controller 8 forms part of a host device (e.g. a base station), one or more of the components shown in FIG. 7 may be shared with the host device if appropriate.

A processor 60 is provided using any combination of one or more of a suitable central processing unit (CPU), multi-processor, microcontroller, digital signal processor (DSP), application specific integrated circuit (ASIC) etc., capable of executing software instructions 66 stored in a memory 64, which can thus be a computer program product. The processor 60 can be configured to execute the methods described with reference to FIGS. 4A-C above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 65 can be any combination of read and write memory (RAM) and read only memory (ROM). The data memory 65 may also comprise persistent storage, which, for example, can be any single one or combination of magnetic memory, optical memory, solid state memory or even remotely mounted memory.

The remote radio head controller 8 further comprises an I/O interface 62 for communicating with other entities. Optionally, the I/O interface 62 also comprises a user interface for operator control of the remote radio head controller 8.

Other components of the remote radio head controller 8 are omitted in order not to obscure the concepts presented herein.

FIG. 8 is a schematic diagram showing functional modules of the software instructions of the remote radio head controller 8 of FIG. 1 or FIG. 7 according to one embodiment. The modules are implemented using software instructions such as a computer program executing in the remote radio head controller 8. The modules correspond to the steps in the methods illustrated in FIGS. 4A-C.

A determiner 8*o* corresponds to steps 42, and 44. A handler 81 corresponds to steps 46 and 48. An applier 82 corresponds to step 50. An evaluator 84 corresponds to steps 40, 40*a* and 40*b*.

FIG. 9 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 66 of FIG. 7. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for controlling uplink contribution from a plurality of remote radio heads in a combiner, wherein each remote radio head is capable of receiving a plurality of carriers on respectively different frequencies, the method being performed in a remote radio head controller and comprising:

(1) determining a first set of at least two remote radio heads, selected from the plurality of remote radio heads which are used for uplink data reception from a first wireless device;

(2) determining a second set of at least two remote radio heads, selected from the plurality of remote radio heads which are used for uplink data reception from a second wireless device, wherein the first set of the at least two remote radio heads and the second set of the at least two remote radio heads are disjoint sets of radio heads using different sets of uplink carriers to serve the first wireless device and the second wireless device, respectively;

(3) selecting, from a first set of uplink carriers of the different sets of uplink carriers, a first uplink carrier for the first wireless device and configuring the first wireless device to use the first uplink carrier;

(4) selecting, from a second set of uplink carriers of the different sets of uplink carriers, a second uplink carrier for the second wireless device and configuring the second wireless device to use the second uplink carrier, wherein each uplink carrier of the first set of uplink carriers is different from an uplink carrier of the second set of uplink carriers;

(5) applying a configuration such that the at least two remote radio heads of the first set refrains from contributing on channels of an intermediate frequency (IF) link of the combiner with uplink signals received on the second uplink carrier and that the at least two remote radio heads of the second set refrains from contributing on channels of the IF link with uplink signals received on the first uplink carrier, wherein the channels of the IF link which are combined in the combiner and can receive contribution on respectively different frequencies from each of the remote radio heads, wherein applying the configuration comprises:
transmitting control signaling comprising the configuration to the at least two remote radio heads of the first set before a scheduled subframe of the first wireless device for uplink data reception on the first uplink carrier; and transmitting control signaling comprising the configuration to the at least two remote radio heads of the second set before a scheduled subframe of the second wireless device for uplink data reception on the second uplink carrier; and repeating steps (1), (2), (3), (4), and (5) for every subframe.

2. The method according to claim 1, wherein the step of determining the first set comprises determining at least two remote radio heads, selected from the plurality of remote radio heads which are used for uplink data reception from the first wireless device and a third wireless device; and wherein determining the second set comprises determining at least two remote radio heads, selected from the plurality of remote radio heads which are used for uplink data reception from the second wireless device and a fourth wireless device.

3. The method according to claim 1, wherein the channels of the IF link is implemented using Ethernet cabling.

4. The method according to claim 1, further comprising: evaluating uplink performance simultaneously of several different wireless links, each wireless link being defined to be between one remote radio head and one wireless device; and wherein determining a first set comprises considering the evaluated uplink performance and wherein determining a second set comprises considering the evaluated uplink performance.

5. The method according to claim 4, wherein evaluating uplink performance comprises: applying a configuration such that only one of the remote radio heads provides uplink signals received on a plurality of evaluation carriers on different sub-channels and configuring a plurality of wireless devices to transmit reference signals on respective mutually unique evaluation carriers.

6. The method according to claim 4, wherein evaluating uplink performance comprises: applying a configuration such that a plurality of the remote radio heads provide uplink signals received on an evaluation carrier on respectively different sub-channels and configuring one wireless device to transmit reference signals on the evaluation carrier.

7. The method according to claim 1, wherein the disjoint first and second set comprise remote radio heads wherein signals received from the first and second set at the combiner do not interfere with each other.

8. The method according to claim 1, wherein applying the configuration comprises:

configuring one or more antennas of the at least two remote radio heads of the first set to turn off an antenna port associated with reception of the second uplink carrier; and configuring one or more antennas of the at least two remote radio heads of the second set to turn off an antenna port associated with reception of the first uplink carrier.

9. A remote radio head controller for controlling uplink contribution from a plurality of remote radio heads in a combiner, wherein each remote radio head is capable of receiving a plurality of carriers on respectively different frequencies, the remote radio head controller comprising:

a processor; and a memory storing instructions that, when executed by the processor, cause the remote radio head controller to:

(1) determine a first set of at least two remote radio heads, selected from the plurality of remote radio heads which are used for uplink data reception from a first wireless device;

(2) determine a second set of at least two remote radio heads, selected from the plurality of remote radio heads which are used for uplink data reception from a second wireless device, wherein the first set of the at least two remote radio heads and the second set of the at least two remote radio heads are disjoint sets of radio heads using different sets of uplink carriers to serve the first wireless device and the second wireless device, respectively;

(3) select, from a first set of uplink carriers of the different sets of uplink carriers, a first uplink carrier for the first wireless device and configuring the first wireless device to use the first uplink carrier;

(4) select, from a second set of uplink carriers of the different sets of uplink carriers, a second uplink carrier for the second wireless device and configuring the second wireless device to use the second uplink carrier, wherein each uplink carrier of the first set of uplink carriers is different from an uplink carrier of the second set of uplink carriers;

(5) apply a configuration such that the at least two remote radio heads of the first set refrains from contributing on channels of an intermediate frequency (IF) link of the combiner with uplink signals received on the second uplink carrier and that the at least two remote radio heads of the second set refrains from contributing on channels of the IF link with uplink signals received on the first uplink carrier, wherein the channels of the IF link which are combined in the combiner and can receive contribution on respectively different frequencies from each of the remote radio heads, wherein applying the configuration comprises:

transmitting control signaling comprising the configuration to the at least two remote radio heads of the first set before a scheduled subframe of the first wireless device for uplink data reception on the first uplink carrier; and transmitting control signaling comprising the configuration to the at least two remote radio heads of the second set before a scheduled subframe of the second wireless device for uplink data reception on the second uplink carrier; and repeat steps (1), (2), (3), (4), and (5) for every subframe.

10. The remote radio head controller according to claim 9, wherein the instructions to determine the first set comprise instructions that, when executed by the processor, cause the remote radio head controller to determine at least two remote radio heads, selected from the plurality of remote radio heads which are used for uplink data reception from the first wireless device and a third wireless device; and the instructions to determine the second set comprise instructions that, when executed by the processor, cause the remote radio head controller to determine at least two remote radio heads, selected from the plurality of remote radio heads which are used for uplink data reception from the second wireless device and a fourth wireless device.

11. The remote radio head controller according to claim 9, wherein the channels of the IF link are configured to be implemented using Ethernet cabling.

12. The remote radio head controller according to claim 9, further comprising instructions that, when executed by the processor, cause the remote radio head controller to:

evaluate uplink performance simultaneously of several different wireless links, each wireless link being defined to be between one remote radio head and one wireless device; and wherein the instructions to determine a first set comprise instructions that, when executed by the processor, cause the remote radio head controller to consider the evaluated uplink performance and the instructions to determine a second set comprise instructions that, when executed by the processor, cause the remote radio head controller to considering the evaluated uplink performance.

13. The remote radio head controller according to claim 12, wherein the instructions to evaluate uplink performance comprise instructions that, when executed by the processor, cause the remote radio head controller to: apply a configuration such that only one of the remote radio heads provides uplink signals received on a plurality of evaluation carriers on different sub-channels; and configure a plurality of wireless devices to transmit reference signals on respective mutually unique evaluation carriers.

14. The remote radio head controller according to claim 12, wherein the instructions to evaluate uplink performance comprise instructions that, when executed by the processor, cause the remote radio head controller to: apply a configuration such that a plurality of the remote radio heads provide uplink signals received on an evaluation carrier on respectively different sub-channels; and configure one wireless device to transmit reference signals on the evaluation carrier.

15. The remote radio head controller according to claim 9, wherein the disjoint first and second set comprise remote radio heads wherein signals received from the first and second set at the combiner do not interfere with each other.

16. A computer program for controlling uplink contribution from a plurality of remote radio heads in a combiner, wherein each remote radio head is capable of receiving a plurality of carriers on respectively different frequencies, the computer program comprising a non-transitory computer readable medium storing instructions, when executed on at least one processor of a remote radio hear controller causes the at least one processor of the remote radio head controller to:
  (1) determine a first set of at least two remote radio heads, selected from the plurality of remote radio heads which are used for uplink data reception from a first wireless device;
  (2) determine a second set of at least two remote radio heads, selected from the plurality of remote radio heads which are used for uplink data reception from a second wireless device, wherein the first set of the at least two remote radio heads and the second set of the at least two remote radio heads are disjoint sets of radio heads using different sets of uplink carriers to serve the first wireless device and the second wireless device, respectively;
  (3) select, from a first set of uplink carriers of the different sets of uplink carriers, a first uplink carrier for the first wireless device and configuring the first wireless device to use the first uplink carrier;
  (4) select, from a second set of uplink carriers of the different sets of uplink carriers, a second uplink carrier for the second wireless device and configuring the second wireless device to use the second uplink carrier, wherein each uplink carrier of the first set of uplink carriers is different from an uplink carrier of the second set of uplink carriers;
  (5) apply a configuration such that the at least two remote radio heads of the first set refrains from contributing on channels of an intermediate frequency (IF) link of the combiner with uplink signals received on the second uplink carrier and that the at least two remote radio heads of the second set refrains from contributing on channels of the IF link with uplink signals received on the first uplink carrier,
wherein the channels of the IF link which are combined in the combiner and can receive contribution on respectively different frequencies from each of the remote radio heads,
wherein applying the configuration comprises:
  transmitting control signaling comprising the configuration to the at least two remote radio heads of the first set before a scheduled subframe of the first wireless device for uplink data reception on the first uplink carrier; and
  transmitting control signaling comprising the configuration to the at least two remote radio heads of the second set before a scheduled subframe of the second wireless device for uplink data reception on the second uplink carrier; and
repeat steps (1), (2), (3), (4), and (5) for every subframe.

17. The computer program according to claim 16, wherein the disjoint first and second set comprise remote radio heads wherein signals received from the first and second set at the combiner do not interfere with each other.

* * * * *